United States Patent
Wiemeyer

(10) Patent No.: US 10,063,151 B2
(45) Date of Patent: Aug. 28, 2018

(54) SURGE TOLERANT POWER SUPPLY SYSTEM FOR PROVIDING OPERATING POWER TO APPLIANCES

(71) Applicant: Progress Rail Locomotive Inc., LaGrange, IL (US)

(72) Inventor: James F. Wiemeyer, Homer Glen, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 0 days.

(21) Appl. No.: 15/341,854

(22) Filed: Nov. 2, 2016

(65) Prior Publication Data

US 2018/0123462 A1    May 3, 2018

(51) Int. Cl.
*H02M 3/335* (2006.01)
*H02M 1/14* (2006.01)
*H02M 1/36* (2007.01)
*H02M 1/32* (2007.01)

(52) U.S. Cl.
CPC ......... *H02M 3/33507* (2013.01); *H02M 1/14* (2013.01); *H02M 1/32* (2013.01); *H02M 1/36* (2013.01); *H02M 3/335* (2013.01)

(58) Field of Classification Search
CPC .................................................. H02M 3/335
See application file for complete search history.

(56) References Cited

U.S. PATENT DOCUMENTS

| 5,463,521 A | 10/1995 | Love |
| 6,031,702 A | 2/2000 | Williams |
| 7,355,867 B2 | 4/2008 | Shuey |
| 7,808,299 B2 | 10/2010 | Mao et al. |
| 7,834,600 B2 | 11/2010 | Bassett et al. |
| 2013/0063102 A1* | 3/2013 | Chen ............. H02M 3/156 323/234 |
| 2013/0229839 A1* | 9/2013 | Escobar ............. H02M 1/12 363/40 |
| 2014/0001971 A1* | 1/2014 | Kumar ............ H05B 41/2883 315/200 R |
| 2014/0009134 A1* | 1/2014 | Bernardon ............. H02M 1/36 323/284 |
| 2016/0036435 A1 | 2/2016 | Young |
| 2016/0294290 A1* | 10/2016 | Tamura .................. H02M 1/08 |

FOREIGN PATENT DOCUMENTS

EP    1 720 239 A1    11/2006

* cited by examiner

*Primary Examiner* — Kyle J Moody
*Assistant Examiner* — Trinh Q Dang
(74) *Attorney, Agent, or Firm* — Oblon, McClelland, Maier & Neustadt

(57) ABSTRACT

An apparatus for providing surge-tolerant power to an appliance is provided. The apparatus includes an input circuit for receiving a source of DC voltage. The apparatus also includes a pass device having a first terminal, a control terminal and a second terminal. Further, the apparatus includes a first means for providing an output voltage based on an input of the pass device. The apparatus also includes a second means for applying a voltage to a control terminal of the pass device based on the output voltage. The voltage is sufficient to put the pass device into a low impedance state between the first terminal and the second terminal thereof.

20 Claims, 4 Drawing Sheets

SURGE TOLERANT POWER SUPPLY SYSTEM FOR PROVIDING OPERATING POWER TO APPLIANCES

TECHNICAL FIELD

The present disclosure relates to a power supply for an appliance, and more particularly to a surge-tolerant power supply for providing operating power to appliances in a locomotive.

BACKGROUND

Electrical appliances for use in a railroad locomotive often derive operating power from a battery through power distribution lines. The power distribution lines, in this case the battery circuit, may deliver high surge voltages to an appliance's power input. International rail electronics standards require that electrical appliances used in locomotives should be able to withstand applications of energetic, high voltage surge pulses and transients carried through the power distribution lines. In addition, non-rail electronics may have similar requirements to withstand surge and transient pulses. However, providing a power supply for appliances having a fixed voltage input, that operates normally within a wide range of voltages, and survives high energy surges and transients is technically challenging. Additionally, limiting inrush current into the electrical appliances upon initial application of the power provides additional challenges. Furthermore, appliances must limit emissions of high frequency currents into the power distribution lines. This requirement typically bears the moniker, "conducted emissions". Successful conformance to this standardized requirement prevents consequent emission of RF interference from the power distribution lines.

European Patent Number 1,720,239 (the '239 patent) provides a DC/DC converter that comprises a switch-mode power supply with a switching transistor, in particular a MOSFET transistor, which is coupled between a DC voltage supply and a load, and a controlling circuit with a controller, which delivers driving pulses for the switching transistor, and a transformer between the controller and the switching transistor. The controlling circuit further comprises a primary circuit with a capacitor and a clamping circuit with a capacitor. A main feature of the '239 patent is that the controlling circuit further comprises a timing circuit, which switches the switching transistor off after a certain on-time of the controller. However, the '239 patent does not provide a power supply for protecting electrical appliances from an exposure to a wide voltage range, high voltage surge transients, and the generation of conducted emissions without suffering unduly large thermal loads.

SUMMARY OF THE DISCLOSURE

In one aspect of the present disclosure, a surge-tolerant power supply system is provided. The surge-tolerant power supply system includes an input circuit having a first input terminal and a second input terminal configured to receive a source of DC voltage. The surge-tolerant power supply system also includes an N-channel MOSFET having a gate terminal, a source terminal, and a drain terminal. The N-channel MOSFET has a characteristic threshold voltage between the gate terminal and the source terminal, and also has a drain terminal that is electrically connected to a positive output of the input circuit. The surge-tolerant power supply system also includes a switch mode DC-to-DC converter having an input electrically connected to the source terminal of the N-channel MOSFET and a negative output of the input circuit. The surge-tolerant power supply system further includes a transformer driver having an input electrically connected to an output of the switch mode DC-to-DC converter. The surge-tolerant power supply system also includes an isolation transformer having a primary winding electrically connected to an output of the transformer driver. The surge-tolerant power supply system further includes a rectifier-filter circuit having an input electrically connected to a secondary winding of the isolation transformer and having an output configured to provide an output voltage. The surge-tolerant power supply system includes a bias circuit having a first input electrically connected to the positive output of the input circuit and a second input electrically connected to the negative output of the input circuit. The surge-tolerant power supply system also includes a DC bias boost circuit having a first input electrically connected to an auxiliary winding of the isolation transformer, a second input electrically connected to an output of the bias circuit, and an output electrically connected to the gate terminal of the N-channel MOSFET. The DC bias boost circuit is configured to apply a voltage at the gate terminal of the N-channel MOSFET that exceeds the characteristic threshold voltage between the gate terminal and the source terminal of the N-channel MOSFET.

In another aspect of the present disclosure, a surge-tolerant power supply is provided. The surge-tolerant power supply includes an input circuit configured to receive a source of DC voltage and a pass device having a first terminal electrically connected to a positive output of the input circuit. The surge-tolerant power supply also includes a voltage converter circuit having an input and at least two isolated outputs. The input is electrically connected to a second terminal of the pass device, and a first isolated output of the at least two isolated outputs is configured to provide an output voltage. The surge-tolerant power supply further includes a bias circuit having a first input electrically connected to a second output of the at least two isolated outputs of the voltage converter circuit, a second input electrically connected to the positive output of the input circuit, and an output electrically connected to a control terminal of the pass device. The bias circuit is configured to apply a voltage on a control terminal of the pass device sufficient to put the pass device into a low impedance state between the first terminal and the second terminal of the pass device.

In yet another aspect of the present disclosure, a surge-tolerant power supply is provided. The surge-tolerant power supply includes an input circuit configured to receive a source of DC voltage, a pass device having a first terminal electrically connected to an output of the input circuit, and a voltage converter circuit having an input and at least one output, the input being electrically connected to a second terminal of the pass device. The surge-tolerant power supply further includes a bias circuit having a first input electrically connected to a first of the least one output of the voltage converter circuit, a second input electrically connected to the output of the input circuit, and an output electrically connected to a control terminal of the pass device, wherein the bias circuit is configured to apply a timed voltage on a control terminal of the pass device sufficient to put the pass device into a low impedance state between the first terminal and the second terminal of the pass device.

In yet another aspect of the present disclosure, an apparatus for providing surge-tolerant power to an appliance is provided. The apparatus includes an input circuit for receiving a source of DC voltage and a pass device having a first terminal, a control terminal and a second terminal. The apparatus also includes a first means for providing an output voltage based on an input of the pass device and a second means for applying a voltage to a control terminal of the pass device based on the output voltage. The voltage is sufficient to put the pass device into a low impedance state between the first terminal and the second terminal thereof.

Other features and aspects of this disclosure will be apparent from the following description and the accompanying drawings.

DETAILED DESCRIPTION

Figure 1:
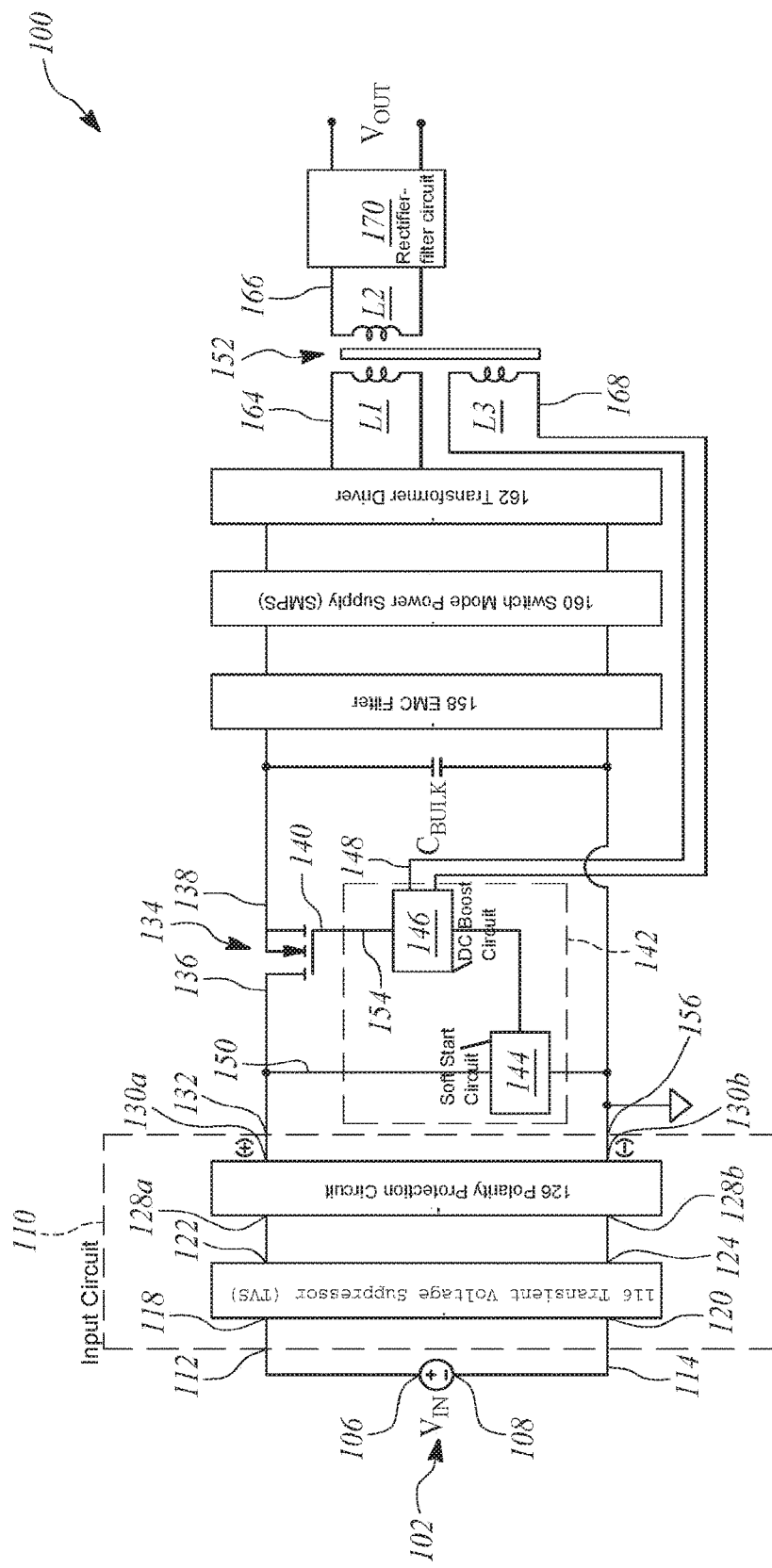
FIG. 1 is a functional block diagram of a surge-tolerant power supply for an appliance of the locomotive, according to one or more embodiments of present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more". Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter provide a surge-tolerant switching power supply. The surge-tolerant switching power supply may be used to provide operating power to appliances on a locomotive. The surge-tolerant switching power supply may incorporate a pass device and a bias circuit. The bias circuit may provide a bias boost voltage to a control terminal of the pass device. The bias boost voltage may be sufficient to put the pass device into a low impedance state. An input for the bias circuit originates from a transformer winding or other coupled inductor within the power supply circuit. The bias circuit also includes a soft-start to limit an inrush current flowing to the appliance.

FIG. 1 is a functional block diagram of a surge-tolerant power supply 100 according to one or more embodiments of the present disclosure. The surge-tolerant power supply 100 of the present disclosure may be used with an appliance of a locomotive (not shown), for example. In one example, the locomotive may include a power source, such as an engine (not shown), that provides power to drive the train, so that the locomotive may pull and/or push the cars of the train. The locomotive further includes a source 102 of DC voltage for supplying power to the appliances in the locomotive. In one embodiment, the source 102 is a battery. The source 102 provides an input voltage '$V_{IN}$' to the appliance. The source 102 has a positive terminal 106 and a negative terminal 108. In order to prevent a transient surge of high voltage from the source 102 to the appliance, the source 102 is connected to the surge-tolerant power supply 100. The "surge-tolerant power supply 100" is hereinafter interchangeably referred to as 'the surge-tolerant power supply system 100' and 'the apparatus for providing surge-tolerant power 100'.

The surge-tolerant power supply 100 may include an input circuit 110. The input circuit 110 may receive the input voltage '$V_{IN}$' from the source 102. The input circuit 110 includes a first input terminal 112 connected to the positive terminal 106 of the source 102. The input circuit 110 includes a second input terminal 114 connected to the negative terminal 108 of the source 102. The first input terminal 112 and the second input terminal 114 receives the input voltage from the source 102. The input circuit 110 may further include a Transient Voltage Suppressor (TVS) 116. The TVS 116 may include at least a first terminal 118 electrically connected to the first input terminal 112 of the input circuit 110 and a second terminal 120 electrically connected to the second input terminal 114 of the input circuit 110. The TVS 116 suppresses a surge in the input voltage '$V_{IN}$' as provided by the source 102. A constructional and functional aspect of the TVS 116 is explained in detail with reference to FIG. 2. As illustrated, the TVS 116 includes a first output terminal 122 and a second output terminal 124.

The input circuit 110 may further include a polarity protection circuit 126. The polarity protection circuit 126 includes an input terminal 128 and an output terminal 130. The input terminals 128a and 128b of the polarity protection circuit 126 is connected to the output terminal 122 and 124 of the TVS 116 respectively. In one embodiment, the polarity protection circuit 126 may be a diode rectifier circuit. In other embodiments, the polarity protection circuit 126 may include two diode rectifiers (one in the positive circuit and one in the negative circuit. In other embodiments, the polarity protection circuit 126 may include a bridge rectifier (four diodes). The polarity protection circuit 126 rejects the input voltage '$V_{IN}$' having reverse polarity. The polarity protection circuit 126 may eliminates any damage to the appliance that may occur due to the input voltage '$V_{IN}$' having reverse polarity. Further, the polarity protection circuit 126 may also reject negative polarity surge input voltages, or make positive and negative surge voltages appear similar by means of full-wave bridge rectification. The output terminal 130a of the polarity protection circuit 126 is connected to a positive output 132 of the input circuit 110. The output terminal 130b of the polarity protection circuit 126 is connected to a negative output 156 of the input circuit 110.

The positive output 132 of the input circuit 110 may be connected to a pass device 134. In the illustrated embodiment, the pass device 134 is an N-channel MOSFET. The pass device 134 is hereinafter interchangeably referred to as "the N-channel MOSFET 'M1'". In another embodiment, the pass device 134 may be any other device including, but not limited to, a bipolar junction transistor. The pass device 134 includes a first terminal 136, a second terminal 138, and a control terminal 140. The first terminal 136 of the pass device 134 is hereinafter interchangeably referred to as "the drain terminal 136". The second terminal 138 of the pass device 134 is hereinafter interchangeably referred to as "the source terminal 138". The control terminal 140 of the pass device 134 is hereinafter interchangeably referred to as "the gate terminal 140". Specifically, the positive output 132 of the input circuit 110 is connected to the first terminal 136 of the pass device 134.

The surge-tolerant power supply 100 may include a bias circuit 142. The bias circuit 142 may include a soft start circuit 144 and a DC bias boost circuit 146. The positive output 132 of the input circuit 110 may be connected to an input 150 of the bias circuit 142 and the soft start circuit 144. The soft start circuit 144 may provide a voltage ramp to the control terminal 140 of the pass device 134 during a start-up period of the power supply 100. A voltage ramp may serve to limit an inrush current when power is provided during start-up of the power supply 100. The DC bias boost circuit 146 may not add a bias boost during start-up of the surge-tolerant power supply 100. The bias circuit 142 may include a first input 148 and a second input 150. The second input 150 of the bias circuit 142 may be fed by the positive output 132 of the input circuit 110. The second input 150 may be connected to the soft start circuit 144. The first input 148 may be connected to the DC bias boost circuit 146. The first input 148 may be fed by an isolated output 168 of isolation transformer 152 of the surge-tolerant power supply 100. The bias circuit 142 may include an output 154 electrically connected to the control terminal 140 of the pass device 134. The bias circuit 142 may provide a bias to the control terminal 140 of the pass device 134. More specifically, the bias circuit 142 may apply a voltage on the control terminal 140 of the pass device 134. The voltage applied by the bias circuit 142 may, in some embodiments, be sufficient to put the pass device 134 into a low impedance state between the first terminal 136 and the second terminal 138, thereby reducing power dissipation of the pass device 134.

The surge-tolerant power supply 100 may further include a bulk capacitor '$C_{BULK}$' connected across the second terminal 138 of the pass device 134 and a negative output terminal 156 of the input circuit 110. The bulk capacitor '$C_{BULK}$' is charged by a drain current '$I_D$' flowing from the first terminal 136 to the second terminal 138 of the pass device 134. The drain current '$I_D$' charges bulk capacitor '$C_{BULK}$' based on the following equation. The drain current '$I_D$' required to charge the bulk capacitor '$C_{BULK}$' is:

$$I_D = C_{BULK} (dV/dt).$$

By controlling a voltage '$V_{GS}$' at the control terminal 140 of the pass device 134, the pass device 134 may control the drain current '$I_D$' into the bulk capacitor '$C_{BULK}$' of the surge-tolerant power supply 100.

The surge-tolerant power supply 100 may further include an electromagnetic compatibility (EMC) filter 158. The EMC filter 158 may be connected across the bulk capacitor '$C_{BULK}$'. The EMC filter 158 may filter high frequency signals to block them from conducting into or conducting out of the input terminals 112 and 114. In one example, the high frequency signals may originate from various components present at a later stage of the surge-tolerant power supply 100. In another example, the high frequency signals may originate from various electrical circuits disposed nearby to the surge-tolerant power supply 100.

The surge-tolerant power supply 100 may also include a Switch Mode Power Supply (SMPS) 160, which is well known in the art. The SMPS 160 is hereinafter interchangeably referred to as "switch mode DC-to-DC converter 160". The SMPS 160 may be electrically connected, through EMC filter 158, to the bulk capacitor '$C_{BULK}$.' Once the bulk capacitor '$C_{BULK}$' is fully charged by the drain current '$I_D$' of the pass device 134, the SMPS 160 starts its operation. The SMPS 160 converts the input voltage '$V_{IN}$' to a predetermined fixed DC voltage.

The SMPS 160 may be electrically connected to a transformer driver 162. The input provided to the transformer driver 162 is a DC voltage. The transformer driver 162 converts the DC voltage to an AC voltage. That is, an output signal of the transformer driver 162 is the AC voltage. The transformer driver 162 may include a circuit for delaying its output signal for a predetermined time during a start-up period of the surge-tolerant power supply 100. The transformer driver 162 may further include a circuit for shutting down an output of the transformer driver 162. In one embodiment, the circuit for shutting down the output of the transformer driver 162 may be an over-voltage detection circuit (not shown). The over-voltage detection circuit may detect a voltage level at the positive output 132 of the input circuit 110. Further, the over-voltage detection circuit may determine whether the voltage level at the positive output 132 of the input circuit 110 is above a predetermined level. The predetermined level may be based on a specification of the surge-tolerant power supply 100.

In another embodiment, the circuit for shutting down the output of the transformer driver 162 may be a programmable processor (not shown). The programmable processor may detect a voltage level at the positive output 132 of the input circuit 110. Further, the programmable processor circuit may determine whether the voltage level at the positive output 132 of the input circuit 110 is above the predetermined level. The programmable processor may shut down the output of the transformer driver 162 when the voltage level at the positive output 132 of the input circuit 110 is above the predetermined level.

In yet another embodiment, the transformer driver 162 may include an oscillator. The oscillator may convert the DC voltage input of the transformer driver 162 to an AC voltage.

The transformer driver 162 may include an output connected to isolation transformer 152. The isolation transformer 152 may include at least a primary winding 'L1', a secondary winding 'L2' and an auxiliary winding 'L3'. The isolation transformer 152 may include an input 164, electrically connected to the primary winding 'L1' of the isolation transformer 152. The input 164 of the isolation transformer 152 may be fed by the transformer driver 162. The isolation transformer 152 may further include at least two isolated outputs. In the illustrated embodiment, the isolation transformer 152 includes a first isolated output 166 and a second isolated output 168. The secondary winding 'L2' is connected to the first isolated output 166. The first isolated output 166 may be connected to a rectifier-filter circuit 170. The rectifier-filter circuit 170 my rectify and filter an output voltage generated at the secondary winding 'L2' of the isolation transformer 152. An output of the rectifier-filter circuit 170 is an output voltage '$V_{OUT}$' of the surge-tolerant power supply 100. The output voltage '$V_{OUT}$' may be supplied to an appliance in order to power the appliance.

The auxiliary winding 'L3' of isolation transformer 152 is connected to the second isolated output 168. The second isolated output 168 may also be connected to the first input 148 of the bias circuit 142. The auxiliary winding 'L3' may provide an input to the DC bias boost circuit 146. The input provided by the third winding 'L3' is rectified and filtered in the DC bias boost circuit 146 to generate a bias boost voltage. In one example, the bias boost voltage may be 4.5V. As mentioned earlier, the control terminal 140 of the pass device 134 may be fed by the bias circuit 142. This bias boost voltage may elevate the voltage at the control terminal 140 of the pass device 134 to a voltage sufficient to drive the pass device 134 into a low impedance state. When driven in this manner, the voltage between the first terminal 136 and the second terminal 138 of pass device 134 may have a value of a few millivolts, and hence a significant current may flow from the first terminal 136 to the second terminal 138 of the pass device 134 with low power dissipation.

Figure 2:
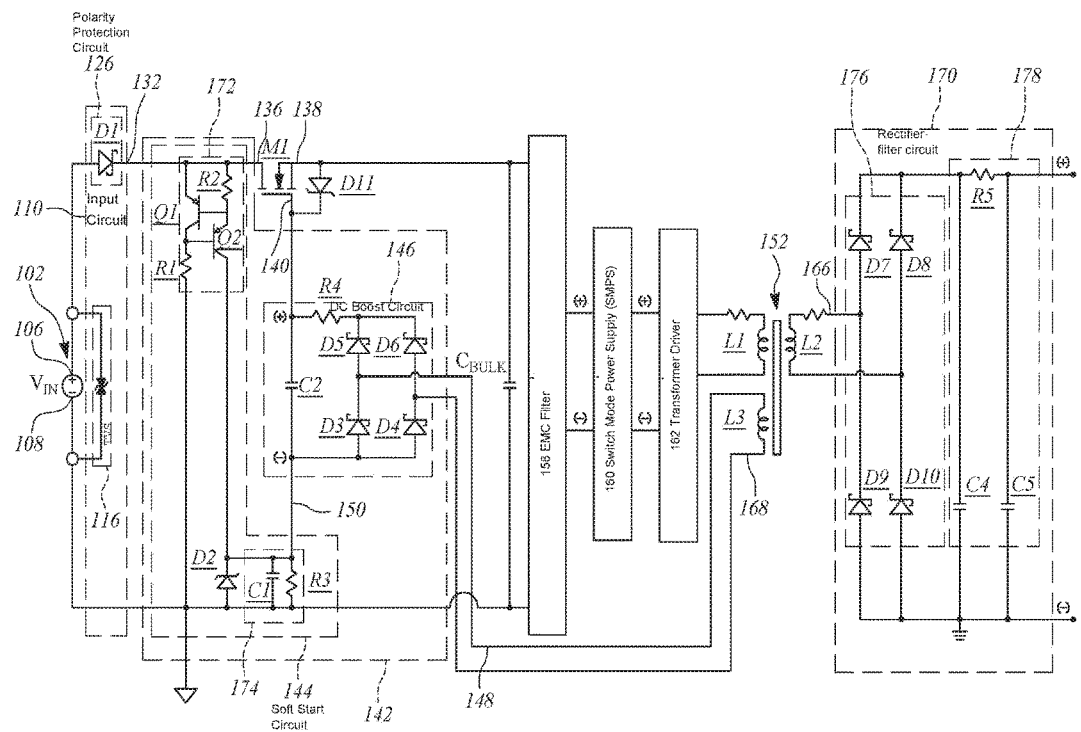
FIG. 2 is a circuit diagram of an exemplary implementation of a surge-tolerant power supply system, according to one or more embodiments of the present disclosure.

FIG. 2 illustrates a circuit diagram of one exemplary implementation of the surge-tolerant power supply system 100. For the sake of brevity, the aspects of the present disclosure which are already explained in detail in the description of FIG. 1, including the EMC filter 158, the switched mode DC to DC converter 160, the transformer driver 162, and the isolation transformer 152 have not been explained in detail with regard to the description of FIG. 2. The surge-tolerant power supply system 100 is connected to the source 102 of DC voltage. The input voltage '$V_{IN}$' may range, for example, from approximately 20VDC to approximately 93VDC, with voltages as high as 130VDC in extreme situations. In some embodiments, a normal input voltage required for an appliance may have different nominal values including, but not limited to, 12VDC, 24VDC, 48VDC, and 74VDC. The source 102 provides an input voltage '$V_{IN}$' to the surge-tolerant power supply system 100 which, in turn, provides power to the appliance. In order to prevent an over-voltage condition or transient surge on the input voltage '$V_{IN}$' from the source 102 affecting the appliance, the source 102 is connected to the surge-tolerant power supply system 100.

In the illustrated embodiment, the input circuit 110 of the surge-tolerant power supply system 100 may receive the input voltage '$V_{IN}$' from the source 102. The TVS 116 may provide a clamping voltage slightly above the maximum expected voltage of the source 102. If the input voltage '$V_{IN}$' is above the maximum expected voltage of the source 102, the TVS 116 may clamp the input voltage to a specified voltage level. In the illustrated embodiment of FIG. 2, the TVS 116 of the input circuit 110 may be a transient suppression diode connected across the source 102. The transient suppression diode may have a normal working voltage tolerance up to 130V. In one example, the TVS 116 may be implemented as an SMCJ130CA, manufactured by Littelfuse® and Fairchild™. The SMCJ130CA provides a maximum clamping voltage of 209V while shunting a pulse surge current of 7.2 amperes. Hence, any input voltage, of limited energy, above 209V may be clamped by the SMCJ130CA. In another example, the TVS 116 may be implemented as, but not limited to, a metal oxide varistor, gas discharge tubes, etc.

The polarity protection circuit 126 of the input circuit 110 may include a diode 'D1'. The diode 'D1' may provide reverse polarity protection by blocking accidental application of reversed polarity power. The diode 'D1' may also reject surge pulses with negative polarity. The input terminal 128 of the polarity protection circuit 126 is connected to the input circuit 110. The output terminal 130 of the polarity protection circuit 126 is connected to the positive output 132 of the input circuit 110.

The diode 'D1' may be connected to the bias circuit 142. In the illustrated embodiment, the bias circuit 142 includes the soft start circuit 144 and the DC bias boost circuit 146. The positive output 132 of the input circuit 110 is connected to the soft start circuit 144. The bias circuit 142 includes a first input 148 and a second input 150. The second input 150 of the bias circuit 142 is fed by the positive output 132 of the input circuit 110. The soft start circuit 144 provides a relatively slow ramp voltage during start-up of the surge-tolerant power supply that passes through the DC bias boost circuit 146. In the illustrated embodiment, the soft start circuit 144 includes a current source 172 and a Resistor Capacitor (RC) circuit 174. The current source 172 may have a constant output current. In one example, the constant output current is approximately 0.7 mA. The current source 172 includes transistors 'Q1' and 'Q2', along with resistors 'R1' and 'R2'. On application of the input voltage '$V_{IN}$', the soft start circuit 144 drives the constant output current into the RC circuit 174 which is connected to the current source 172. The RC circuit 174 includes a capacitor 'C1' connected in parallel with a resistor 'R3'. The constant output current from the current source 172 ramps a voltage at the RC circuit 174 based on the output current value and a value of the capacitor 'C1' and resistor 'R3'. 'R3' may have a relatively large resistance value so that it has only a minor effect on the ramp voltage, but may provide a discharge path for the charge stored on 'C1'. This discharge path may allow the bias circuit to track the input voltage '$V_{IN}$', when '$V_{IN}$' changes, for example, from a higher voltage value to a lesser voltage value. The ramp in voltage may serve to limit the inrush current when power is provided during start-up of the surge-tolerant power supply. A Zener diode (or avalanche diode) 'D2' may be connected in parallel with the RC circuit 174 to limit a base reference voltage for the gate terminal 140 of the N-channel MOSFET 'M1'.

An output voltage of the soft start circuit 144 may be connected to the DC bias boost circuit 146. The DC bias boost circuit 146 includes a diode bridge circuit having diodes 'D3', 'D4', 'D5' and 'D6' connected at four arms of a bridge. In one example, the first input 148 of the bias circuit 142 is connected across diodes 'D5' and 'D6'. The diodes 'D5' and 'D6' are connected in series with a resistor 'R4'. The first input 148 of the bias circuit 142 may be electrically connected to the second isolated output 168 of the isolation transformer 152. During normal operation, the AC voltage from the L3 output of isolation transformer 152 may be rectified by the diode bridge in DC bias boost circuit 146 and filtered by capacitor 'C2'.

In the illustrated embodiment, an output of the DC bias boost circuit 146 may be electrically connected to the N-channel MOSFET 'M1'. As mentioned earlier, the N-channel MOSFET 'M1' includes the drain terminal 136, the source terminal 138 and the gate terminal 140. The N-channel MOSFET 'M1' has a characteristic threshold voltage '$V_T$' between the gate terminal 140 and the source terminal 138. The source terminal 138 and the gate terminal 140 may be interconnected with a diode D11. Further, the drain terminal 136 may be electrically connected to the positive output 132 of the input circuit 110. The output of the DC bias boost circuit 146 may be connected to the gate terminal 140 of the N-channel MOSFET 'M1'. During normal operation, the output of DC bias boost circuit 146 may elevate a voltage at the gate terminal 140 of the N-channel MOSFET 'M1' above the voltage at the source terminal 138 by at least the characteristic threshold voltage '$V_T$' of the N-channel MOSFET 'M1', placing the N-channel MOSFET 'M1' in a low impedance state with little power dissipation.

In the circuit illustrated in FIG. 2, the voltage between the drain terminal 136 and the source terminal 138 ('$V_{DS}$') is the sum of the voltage '$V_{DG}$' between the drain terminal 136 and the gate terminal 140 and a voltage '$V_{GS}$' between the gate terminal 140 and the source terminal 138. In one example, during start-up of the surge-tolerant power supply system 100, the voltage between the gate terminal 140 and the source terminal 138 ('$V_{GS}$') ranges from 1V to 4.5V for the N-channel MOSFET 'M1' having relatively high transconductance. Hence, without the boost voltage provided by DC bias boost circuit 146, the steady state power dissipation of the N-channel MOSFET 'M1' may be as high as 13.5 watts for an appliance having a 3 ampere current demand.

In one example, the bulk capacitor '$C_{BULK}$' may be connected to the source terminal 138 of the N-channel MOSFET. During start-up of the surge-tolerant power supply 100, the drain current '$I_D$' from the N-channel MOSFET 'M1' charges the bulk capacitor '$C_{BULK}$' with a straight line voltage characteristic.

The surge-tolerant power supply 100 may include a rectifier-filter circuit 170 connected to the secondary winding 'L2' associated with the first isolated output 166. The rectifier-filter circuit 170 may rectify and filter an output voltage generated at the secondary winding 'L2' of the isolation transformer 152. In one embodiment, the rectifier-filter circuit 170 may include a full wave rectifier circuit 176. The full wave rectifier circuit 176 may include diodes D7, D8, D9, and D10. The full wave rectifier circuit 176 converts an AC output voltage generated by the isolation transformer 152 to DC output voltage. An output of the full wave rectifier circuit 176 is connected to a filter circuit 178 having a resistor R5 and capacitors C4 and C5. The filter circuit 178 filters the ripples of the output of full wave rectifier circuit 176. An output of the rectifier and the filter circuit 178 is an output voltage '$V_{OUT}$' of the surge tolerant power supply system 100. The output voltage '$V_{OUT}$' may be supplied to the appliance to power the appliance.

In exemplary operation, when the N-channel MOSFET 'M1' charges the bulk capacitance '$C_{BULK}$', the switched mode DC to DC converter 160 and the transformer driver 162 may operate to drive the isolation transformer 152. The auxiliary winding 'L3' of the isolation transformer 152 provides an input AC voltage to the first input 148 of the DC bias boost circuit 146. The DC bias boost circuit 146 may rectify and filter the AC voltage to produce a DC bias boost voltage. This may cause the voltage at the gate terminal 140 of the N-channel MOSFET to elevate above the voltage at the source terminal 138 by at least the characteristic threshold voltage '$V_T$' of the N-channel MOSFET 'M1', placing the N-channel MOSFET 'M1' in a low impedance state with minimal power dissipation.

Figure 3:
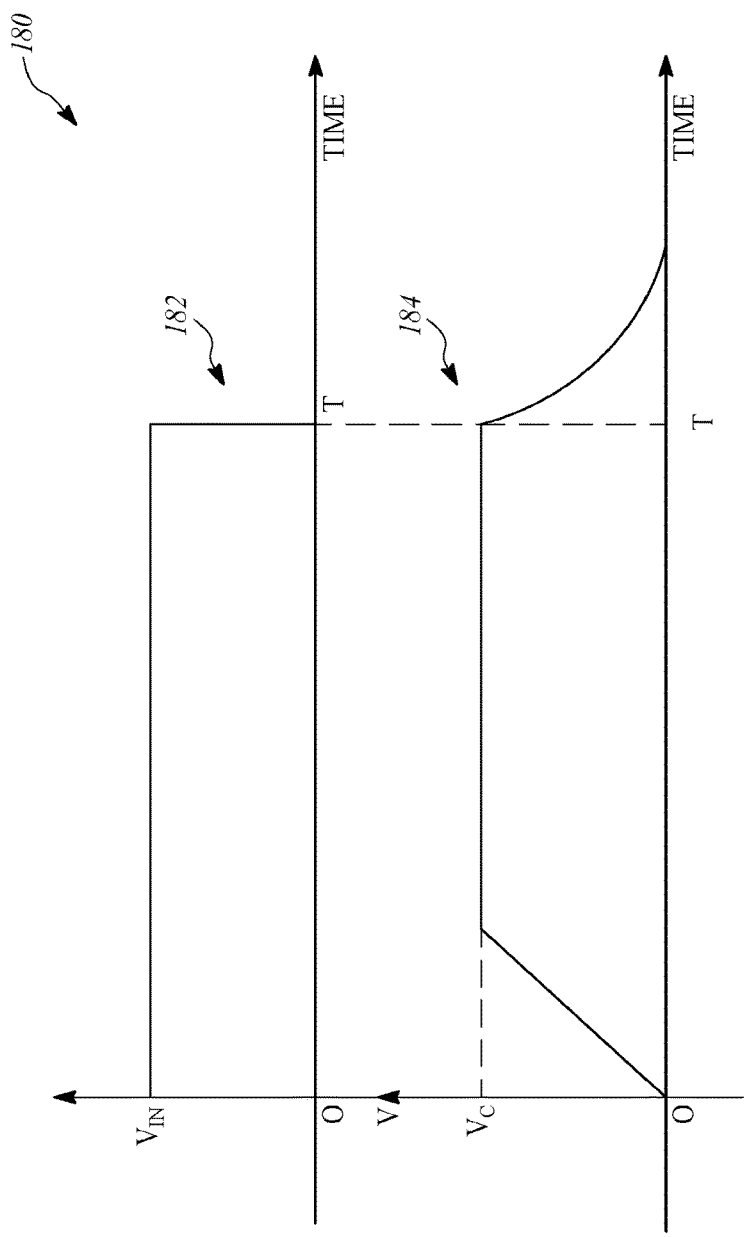
FIG. 3 is a graphical representation of start-up voltage waveforms from a soft-start circuit, according to one or more embodiments of the present disclosure.

FIG. 3 is a graphical representation 180 of a startup voltage waveform of the soft start circuit 144 of the surge-tolerant power supply 100. A first graphical representation 182 depicts the input voltage '$V_{IN}$' supplied to the soft start circuit 144 by the input circuit 110 for a time interval 'T'. Based on the input voltage, the current source 172 of the soft start circuit 144 may generate a constant current of 0.7 mA. A second graphical representation 184 depicts an output voltage of the soft start circuit 144. Based on the constant input current, this ramps the voltage across capacitor 'C1' in a straight line with a slope determined by the current value and the capacitance value (V=IΔt/C). The soft start circuit 144 provides a maximum output voltage '$V_C$' across capacitor 'C1' and the resistor 'R3' of the RC circuit 174 that is either '$V_{IN}$' or the Zener/avalanche voltage of diode 'D2,' whichever is less. The output voltage remains at the maximum output voltage 'Vc' at the time interval 'T' until the input voltage '$V_{IN}$' is removed. Once the supply of input voltage '$V_{IN}$' is removed, the output voltage across the RC circuit 174 gradually decreases to zero.

Figure 4:
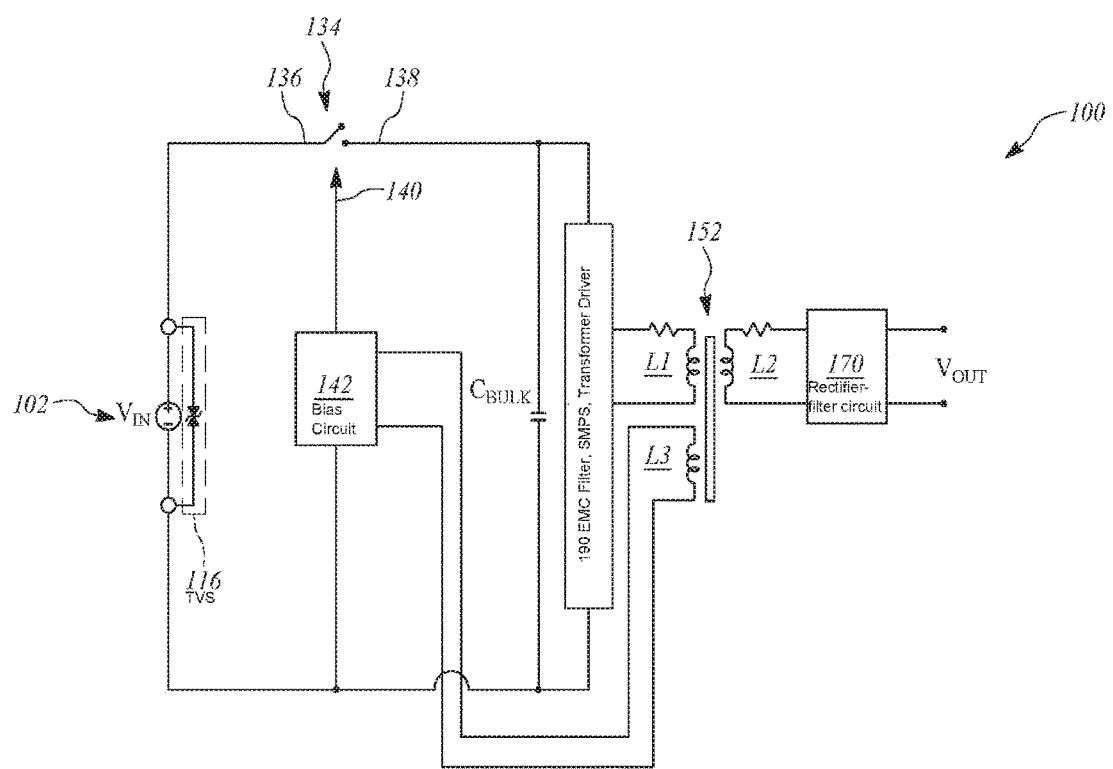
FIG. 4 is a circuit diagram of the surge-tolerant power supply of FIG. 1 at transient voltage input condition, according to one or more embodiments of the present disclosure.

FIG. 4 is a simplified circuit diagram illustrating an operation of the surge-tolerant power supply 100 during a transient event. When a transient input voltage appears at the source 102, the TVS 116 of the surge-tolerant power supply 100 may clamp the input voltage '$V_{IN}$' to a voltage level acceptable for safe operating conditions of the surge-tolerant power supply 100. The TVS 116, in some embodiment, may provide a clamping voltage of approximately 209V while shunting a pulse surge current of 7.2 amperes. Hence, transients of limited energy above 209V may be clamped by the TVS 116.

In an exemplary transient event, a transient input voltage appearing at the first terminal 136 of the pass device 134 may be a low impedance voltage pulse of approximately 200V with duration of about 500 microseconds. In such a scenario, the voltage at the first terminal 136 may increase but the voltage at the second terminal 138 may remain below the voltage at the control terminal 140, which may have an instantaneously fixed value. The pass device 134 may therefore block the 200V pulse from entering the EMC filter, SMPS, and transformer driver (collectively illustrated as 190) by offering a high impedance to the circuit. A transient voltage of much lesser magnitude may appear at the second terminal 138 of the pass device 134. An increase in the voltage at the second terminal 138 may inject a substantial charge current into the bulk capacitor '$C_{BULK}$' further shunting the transient input voltage from the protected circuitry.

INDUSTRIAL APPLICABILITY

The surge-tolerant power supply 100 provides substantial over-voltage and surge immunity to protect an appliance from exposure to a wide voltage range and high voltage surge transients without suffering unduly large thermal loads. The surge-tolerant power supply 100 has modest circuit complexity, high efficiency and reduced thermal dissipation compared to typical high surge-tolerant circuits.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A surge-tolerant power supply system comprising:
an input circuit having a first input terminal and a second input terminal configured to receive a source of DC voltage;
an N-channel MOSFET having a gate terminal, a source terminal, and a drain terminal, the N-channel MOSFET having a characteristic threshold voltage between the gate terminal and the source terminal, and the drain terminal being electrically connected to a positive output of the input circuit;
a switch mode DC-to-DC converter having an input electrically connected to the source terminal of the N-channel MOSFET and a negative output of the input circuit;
a transformer driver having an input electrically connected to an output of the switch mode DC-to-DC converter;
an isolation transformer having a primary winding electrically connected to an output of the transformer driver;
a rectifier-filter circuit having an input electrically connected to a secondary winding of the isolation transformer and having an output configured to provide an output voltage;
a bias circuit having a first input electrically connected to the positive output of the input circuit and a second input electrically connected to the negative output of the input circuit; and
a DC bias boost circuit having a first input electrically connected to an auxiliary winding of the isolation transformer, a second input electrically connected to an output of the bias circuit, and an output electrically connected to the gate terminal of the N-channel MOSFET,
wherein the DC bias boost circuit is configured to apply a voltage at the gate terminal of the N-channel MOSFET that exceeds the characteristic threshold voltage between the gate terminal and the source terminal of the N-channel MOSFET.

2. The surge-tolerant power supply system of claim 1, wherein the bias circuit is configured to provide a voltage ramp at the output of the bias circuit during a start-up period.

3. The surge-tolerant power supply system of claim 1, wherein the input circuit comprises a transient voltage suppressor having a first terminal electrically connected to the first input terminal of the input circuit and a second terminal electrically connected to the second input terminal of the input circuit.

4. The surge-tolerant power supply system of claim 1, wherein the input circuit comprises a polarity protection circuit having a first terminal electrically connected to the first input terminal of the input circuit and a second terminal electrically connected to the positive output of the input circuit.

5. The surge-tolerant power supply system of claim 1, wherein the transformer driver is configured to delay an output signal of the transformer driver for a predetermined time during a start-up period.

6. The surge-tolerant power supply system of claim 1, wherein the transformer driver is configured to shut down an output signal of the transformer driver when a voltage level at the positive output of the input circuit is above a predetermined level.

7. The surge-tolerant power supply system of claim 1, wherein the transformer driver is configured to shut down an output signal of the transformer driver when a voltage level at the positive output of the input circuit is above a predetermined level.

8. A surge-tolerant power supply comprising:
an input circuit configured to receive a source of DC voltage;
a pass device having a first terminal electrically connected to a positive output of the input circuit;
a voltage converter circuit having an input and at least two isolated outputs, the input being electrically connected to a second terminal of the pass device, and a first isolated output of the at least two isolated outputs is configured to provide an output voltage;
a bias circuit having a first input electrically connected to a second output of the at least two isolated outputs of the voltage converter circuit, a second input electrically connected to the positive output of the input circuit, and an output electrically connected to a control terminal of the pass device, wherein the bias circuit is configured to apply a voltage on the control terminal of the pass device sufficient to put the pass device into a low impedance state between the first terminal and the second terminal of the pass device;
wherein the voltage converter circuit includes a switch mode DC-to-DC converter having, as an input, the input of the voltage converter circuit, a transformer driver having an input electrically connected to an output of the switch mode DC-to-DC converter, an isolation transformer having a primary winding electrically connected to an output of the transformer driver, and a rectifier-filter circuit having an input electrically connected to a secondary winding of the isolation transformer and having an output configured to provide the output voltage; and
wherein the transformer driver is configured to shut down an output signal of the transformer driver when a voltage level at the positive output of the input circuit is above a predetermined level.

9. The surge-tolerant power supply of claim 8, wherein the bias circuit is configured to provide a voltage ramp at the output of the bias circuit during a start-up period.

10. The surge-tolerant power supply of claim 8, wherein the input circuit comprises a transient voltage suppressor having a first terminal electrically connected to a first input terminal of the input circuit and a second terminal electrically connected to a second input terminal of the input circuit.

11. The surge-tolerant power supply of claim 8, wherein the input circuit comprises a polarity protection circuit having a first terminal electrically connected to the first input terminal of the input circuit and a second terminal electrically connected to the positive output of the input circuit.

12. The surge-tolerant power supply of claim 8, wherein the transformer driver is configured to delay an output signal of the transformer driver for a predetermined time during a start-up period.

13. The surge-tolerant power supply of claim 12, wherein the transformer driver is configured to shut down an output signal of the transformer driver when the voltage level at the positive output of the input circuit is above a predetermined level.

14. A surge-tolerant power supply comprising:
an input circuit configured to receive a source of DC voltage;

a pass device having a first terminal electrically connected to an output of the input circuit;

a voltage converter circuit having an input and at least one output, the input being electrically connected to a second terminal of the pass device; and a bias circuit having a first input electrically connected to a first of the least one output of the voltage converter circuit, a second input electrically connected to the output of the input circuit, and an output electrically connected to a control terminal of the pass device, wherein the bias circuit is configured to apply, after a predetermined start-up period, a voltage on the control terminal of the pass device sufficient to put the pass device into a low impedance state between the first terminal and the second terminal of the pass device;

wherein the bias circuit is further configured to provide a voltage ramp on the control terminal of the pass device during the predetermined start-up period.

15. The surge-tolerant power supply of claim 14, wherein the voltage converter circuit has a second output configured to provide an output voltage.

16. The surge-tolerant power supply of claim 14, wherein the input circuit comprises a transient voltage suppressor having a first terminal electrically connected to a first input terminal of the input circuit and a second terminal electrically connected to a second input terminal of the input circuit.

17. The surge-tolerant power supply of claim 14, wherein the voltage converter circuit includes a switch mode DC-to-DC converter having, as an input, the input of the voltage converter circuit, a transformer driver having an input electrically connected to an output of the switch mode DC-to-DC converter, and an isolation transformer having a primary winding electrically connected to an output of the transformer driver.

18. The surge-tolerant power supply of claim 14, wherein the input circuit comprises a polarity protection circuit having a first terminal electrically connected to a first input terminal of the input circuit and a second terminal electrically connected to the output of the input circuit.

19. The surge-tolerant power supply of claim 17, wherein the transformer driver is configured to shut down an output signal of the transformer driver when a voltage level at the output of the input circuit is above a predetermined level.

20. The surge-tolerant power supply of claim 17, wherein the transformer driver is configured to delay an output signal of the transformer driver for a predetermined time.

\* \* \* \* \*